United States Patent [19]

Beasley

[11] 4,303,763

[45] Dec. 1, 1981

[54] UNSATURATED ETHYLENE POLYMERS AND PROCESSES FOR PREPARING AND FOR USING SAME

[75] Inventor: Marvin L. Beasley, Alva, Okla.

[73] Assignee: RESDEV, Inc., Alva, Okla.

[21] Appl. No.: 113,092

[22] Filed: Jan. 17, 1980

[51] Int. Cl.$^3$ ............................................. C08 255/02
[52] U.S. Cl. ................................................... 525/313
[58] Field of Search ........................................ 525/313

[56] References Cited

U.S. PATENT DOCUMENTS 3,959,410   5/1976   Di Rossi ............................. 525/313

FOREIGN PATENT DOCUMENTS

| | | | |
|---|---|---|---|
| 602788 | 8/1960 | Canada ............................. | 525/313 |
| 42-7689 | 3/1967 | Japan ................................ | 525/313 |
| 42-12526 | 7/1967 | Japan ................................ | 525/313 |
| 43-9231 | 4/1968 | Japan ................................ | 525/313 |
| 43-26101 | 11/1968 | Japan ................................ | 525/313 |

*Primary Examiner*—William F. Hamrock
*Attorney, Agent, or Firm*—Woodard, Weikart, Emhardt & Naughton

[57] ABSTRACT

Unsaturated ethylene polymers and processes for preparing and using the same. These polymers are characterized by the process, comprising the step of reacting a saturated, linear polyethylene directly with a diene monomer in the melt phase, the diene monomer having from 1 to about 10 carbon atoms and being present in an amount up to about 5 weight percent of the melt composition. The reaction occurs under mild conditions, including atmospheric pressure and temperatures in the range of between about 250° F. and about 400° F. Moreover, no chemical or irradiant initiation is required. Processes for using these unsaturated polymers in cross-linking and addition reactions are also disclosed, involving reacting such polymers with a saturated, linear polyethylene or with some other polymeric or nonpolymeric functional group susceptable of free-radical addition reaction, the functional component being present in an amount of between about 20 weight percent and about 40 weight percent of the melt phase. Mild conditions are observed and no chemical or irradiant initiation is needed. The pure cross-linked ethylene and other polymers obtained exhibit improved properties, particularly in the cryogenic and dielectric areas.

22 Claims, No Drawings

UNSATURATED ETHYLENE POLYMERS AND PROCESSES FOR PREPARING AND FOR USING SAME

BACKGROUND OF THE INVENTION

This invention relates broadly to the field of polymer chemistry, and more particularly to unsaturated ethylene polymers having active carbon-carbon double bonds in the polymer chains and to processes for preparing and for using the same.

The field of polymer chemistry is ever changing, with the discovery of new compositions and processes for particular uses or for achieving specified results in a new or improved manner. Polymers, generally, are long chains of atoms having high molecular weights and formed by the linking of simpler molecules known as monomers through sharing of electrons. This electron sharing is termed "covalent bonding" and is characteristic of certain unsaturated hydrocarbons exhibiting a carbon-carbon double bond in their chemical structure. One such family of hydrocarbons is the alkenes of which ethylene, $C_2H_4$, is the simplest member.

Polymerization is the process of joining together these many small molecules to make very large molecules. The particular kind of polymerization undergone may be addition polymerization, in which many molecules of monomer are simply added together, or condensation polymerization, in which monomer molecules join by the elimination of small molecules, usually water. Proteins and polysaccharides are examples of condensation polymers. Nylon, like the proteins, is a polyamide formed by the condensation of a diamine (such as hexamethylenediamine, $H_2N(CH_2)_6NH_2$) and a dicarboxylic acid (such as adipic acid, $HOOC(CH_2)_4COOH$).

Addition polymerization, on the other hand, is thought to proceed by either a free-radical or an ionic mechanism. Both require the presence of at least a small amount of an initiator or catalyst. The free-radical type uses initiators such as peroxides which break down to form free radicals which add to monomer molecules, and in so doing generate other free radicals which eventuate in the long chain molecule. The ionic type causes polymerization through the involvement and breakdown of intermediate ions such as positive ions (cations), when the catalyst is an acid, or negative ions (anions), when the catalyst is a base. This newer ionic polymerization is considered by some to be particularly beneficial in view of its often milder reaction conditions and the stereochemical control it provides.

When ethylene gas, mentioned above, is placed under extreme heat and pressure in the presence of oxygen and under the influence of a catalyst or initiator, its carbon-carbon double bond will open in a polymerization reaction. The compound obtained is called polyethylene, and consists of a long chain of molecules which may exhibit a wide range of molecular weights (between about 1,000 and about 100,000 or higher). It has a wax-like consistency and properties that vary according to both molecular weight and type, e.g., low-density or branched, and high-density or linear. The linear type is typically more crystalline, more heat-resistant, and stiffer than the low-density or conventional type. Both have low water absorption, excellent electrical resistance, high resistance to most solvents and chemicals, and are tasteless and odorless. Polyethylene is well suited to many commercial applications, particularly where only moderate to low heat exposure is encountered. It is most familiar as the plastic material used for packaging films and various other flexible molded plastics.

As the uses for ethylene polymers have grown over the years, so also have the possible approaches to tailoring specific properties by manufacture or formulation to better suit the same. Physical properties such as melting point ranges, specific gravity, dielectrics, stress and crack resistance, fatigue, flexibility, toughness, and crystallinity are often the targets of this tailoring process. One common approach is through the presence of side branches in the polyethylene chain which can cause variations in properties such as density, hardness, flexibility, melt viscosity, transparency, and others. Chain branching, however, is a characteristic of the polymerization process and is not easily changed after the long chain molecules are formed.

Compounding and copolymerization are two other common methods. Compounding involves the addition of certain additives to polyethylene resins to arrive at desired properties. Common examples include stabilizers (such as antioxidents and carbon black), slip and antiblock agents, antistatic agents, and pigments. A modifier such as polyisobutylene or butyl rubber or others may also be used to compound the resin. Copolymerization, on the other hand, involves the mixing of two or more unsaturated monomers which are then allowed to polymerize together. The resulting polymer contains units of both monomers which may exhibit distributions ranging from complete randomness to strick alternation along the polymer chain. In this regard, much work has been done with copolymerizing ethylene and other hydrocarbons such as 1-butene, styrene, acrylic, acrylonitrile, vinyls and other substituted dienes.

Physical blending of different polymers, in the melt phase and otherwise, is yet another procedure for attempting to achieve a desirable balance of physical or chemical properties for a particular application. Problems of achieving homogeneous blends are often encountered, however, which cause added problems in view of the many fabrication techniques employed in the industry, such as injection, blow, and rotational molding, vacuum forming, and others.

Cross-linking of polymer chains is often used in tailoring properties of thermoplastic polymers such as polyethylene for high-temperature applications, for clarity of high-density materials, and for other uses. By its definition, this method involves the polymer molecules becoming linked together to produce a three-dimensional structure. The resulting product is no longer thermoplastic, but is thermoset and is useful for applications such as wire and cable coatings and many others. Cross-linking proceeds by two known mechanisms. The first is by chemical reaction and requires high temperatures and high pressures (often inert) and the presence of cross-linking agents such as organic peroxides, diperoxides and hydroperoxides, azo-compounds, sulfur or sulfur compounds, and many others. The second is by irradiation in which the activation energy required to cross-link the polymer chains is typically applied through high-energy beta or gamma radiation. Both methods are complex and often costly, the first requiring harsh conditions and ancillary agents which may become entrapped within the cross-linked structure as unwanted impurities while the second requires costly equipment and extreme care during use.

Moreover, with all the above methods except copolymerization, which proceeds from the monomer stage, problems are encountered in obtaining the desired properties by changing the ethylene or other polymers once the long chain molecules are formed. Polymers generally are thought of as not highly reactive compounds. Polyethylene, in particular, is considered very inert as being a saturated molecule having no unoccupied bonding sites. It is for this reason that drastic measures (such as irradiation or chemical attack using outside agents) are required to alter its structure once formed. Physical blending of formed ethylene or other polymers can achieve some change in properties, but is no solution to the problem.

The need exists for new ethylene and other polymers more readily susceptible to structural change to permit simple and expedient tailoring of physical properties. The need also exists for new and improved processes for preparing and for using the same. Applicants' present invention addresses these needs.

SUMMARY OF THE INVENTION

One aspect of this invention comprises unsaturated ethylene polymers exhibiting chemically-active carbon-carbon double bonds in the polymer chains. One embodiment accomplishing the process characterizing these ethylene polymers is by reacting a saturated, linear polyethylene directly with a diene monomer in the melt phase and without chemical or irradiant initiation. This direct one-step reaction is a significant discovery in that the unsaturated, chemically-active polyethylene product not only exhibits end uses as other polyethylenes, but it readily undergoes free-radical addition and cross-linking of functional adjuvants both polymeric and nonpolymeric in structure thereby providing a ready means for tailoring physical properties of the polymer to meet specified applications. It thus marks a significant improvement over known methods of tailoring such properties as described above. Mild conditions are observed and significant yields are achieved.

A second aspect of this invention is a continuation of applicants' above discovery in which processes are provided for further reacting applicants' unsaturated, chemically-active ethylene polymers to add functional adjuvants and to cross-link the same with additional ethylene or other polymers. Embodiments accomplishing these processes are by reacting applicants' active polyethylenes with specific concentrations of the desired functional groups or other saturated, linear polyethylenes or other polymers in the melt phase under mild conditions and without chemical or irradiant initiation. These embodiments also mark significant advances over prior art tailoring techniques because of the simple, direct, efficient and controlled conversion of the unsaturated compounds to their modified or cross-linked forms. The produce manufacturer can thus tailor properties to a specific use or product while the basic manufacturer of the polyethylene produces only a single, unsaturated resin. Uses for this single resin can in turn range from toys, to containers, to material handling trucks and to high-frequency electronic components. Properties needed for extreme conditions, such as heat and cold, can be readily achieved as, for example, by changing the melt phase composition or the molecular weight of the resin or resins being used.

DESCRIPTION OF THE PREFERRED EMBODIMENT

As indicated above, aspects of this invention comprise unsaturated, chemically-active ethylene polymers and processes for preparing and for using the same without the complexity or inefficiency of known prior art methods. These processes are described in full below, with specific examples of each following the detailed disclosure.

Unsaturated Ethylene Polymers and Process for Preparing Same

Defined broadly, this process comprises the single step of reacting a saturated, linear polyethylene directly with a diene monomer in the melt phase. Mild conditions are observed and no chemical or irradiant initiation is used.

In this context, reference to "a saturated, linear polyethylene" is meant to include any commercially-available ethylene polymer having minimal or no branching and no chemically-active bonding sites. No absolute limitations are presently known, although testing to date has indicated that low-density (about 0.900–0.920) and medium-density (about 0.920–0.945) polyethylenes are preferred, with densities greater than about 0.945 tending to be more difficult in adding the active carbon-carbon double bonds to the polymer chains during the reacting step. Numerous polyethylenes are available within these ranges for use in applicants' processes described both here and below. A few examples include GULF No. 5104 polyethylene, EXXON LD 102 polyethylene and USI CHEMICALS No. 786 polyethylene (known as PETROTHENE), all of which have densities around 0.923.

The diene monomer used in the preferred process is limited by testing performed to date both as to concentration and carbon content. Experiments have shown that even trace amounts of the monomer result in some addition of active bonding sites to the polyethylene molecules, although the point of saturation is apparently reached at a concentration of about 95:5 weight percent polyethylene to diene monomer in the melt phase. Amounts in excess of about 5 weight percent of the monomer appear to vaporize off during heating with no effect on the reaction itself, although future research may indicate this result does not or need not occur. For example, amounts in excess of 20 or 30 weight percent of the monomer may in fact polyermize during the reacting step becoming entangled with the now unsaturated polyethylene molecules and forming more of a copolymer structure.

Present experiments have also shown that diene monomers having up to at least about 10 carbon atoms react with the commercially-available polyethylenes to give the carbon-carbon active double bonding sites in the reaction products, which are then used in controlled cross-linking and reacting procedures as illustrated below. Larger diene molecules, having greater molecular weights and carbon contents, would be expected to similarly react in applicants' process until prevented by steric hindrance attributable to the size or complex structure of the monomer molecules. In this regard, the ultimate key appears to be the reactivity of the carbon-carbon double bonds in the molecules. If those bonds are shielded by complex branches such as tertiary butyl groups and the like, it appears applicants' process will most probably not occur. If the monomer remains linear, or branched to a lesser degree, sufficient reactivity may exist for the process to proceed with monomers having 20 or more carbon atoms.

The idea of chemically combining an already-formed ethylene polymer with a diene monomer of any type is not taught or even suggested in the art. Once formed, polyethylene molecules are considered inert and nonreactive except under extreme conditions of irradiation or strong chemical attack, as is experienced for example in known cross-linking procedures.

Applicants have discovered that the believed stability (and invulnerability) of ethylene polymers is not always true. On the contrary, simple commercially-available polyethylenes have been shown to react with diene monomers in the melt phase under mild conditions to produce chemically-active, unsaturated molecules that exhibit both end uses and valuable intermediate uses as described below. Instead of reacting, the diene monomer would be expected to burn (or vaporize) off during melting or to fall out once the mixture is subsequently cooled. However, chemical reaction does occur as verified by the differing physical properties of the resulting plastic and by infrared analysis which indicated the presence of carbon-carbon double bonds in the recovered polyethylene product. Moreover, the reaction proceeds without chemical or irradiant initiation as required in known polymerization, copolymerization, compounding, and cross-linking techniques. The advantages of applicants' discovery are clear, as are its improvements over the art.

The preferred conditions for applicants' reaction are as follows:

An amount of commercially-available linear polyethylene in pulverized form was first placed in a reaction vessel. Diene monomer in an amount up to about 5 weight percent of the melt composition was then placed in the vessel, and the contents were mixed to achieve thorough dispersal of the monomer throughout the polyethylene resin. The precise technique and conditions of this mixing were determined by the diene monomer used. For example, applicants' preferred monomer was 1,3-butadiene which has a boiling point of about 4° C. and no effective solid phase. To prevent initil boiling off, the 1,3-butadiene was added to the vessel in liquid form at a temperature below 4° C. and then mixed for about 15 minutes until most of the monomer had been absorbed into the pulverized resin. In the case of larger diene monomers with carbon contents of about 6 or more, effective solid phases are obtainable. The monomer can then be pulverized and dry mixed with the polyethylene resin to obtain satisfactory dispersal prior to melting, although applicants still prefer mixing these larger diene monomers in the liquid phase.

After mixing, the vessel and its contents were heated to a reaction temperature of between about 250° F. and about 400° F. and were maintained at this temperature and at atmospheric pressure until the polyethylene had melted. The precise temperature and period for the reaction depend, of course, upon many factors, including available facilities, reagent concentrations, desired reaction yields, the diene monomer chosen, and the like. As previously stated, an important advantage is that the reaction proceeds at atmospheric pressure and without the need for chemical or irradiant initiation as is common with prior art procedures. With this in mind, experiments to date have shown the preferred temperature is 278° F. and the preferred reaction time is 12 minutes to acieve total reaction of the polyethylene (and the preferred 1,3-butadiene monomer) to its chemically-active, unsaturated form. As the molecular weight and carbon content of the monomer increase, so will this preferred temperature and reaction period, as a general rule.

The reaction product which now has carbon-carbon active double bonding sites was then allowed to cool. It was pulverized and found readily usable in commercial applications such as blow, injection or vacuum-forming and rotational molding procedures. Still further, the unsaturated polyethylene was proven a valuable intermediate in further addition and cross-linking procedures as illustrated below.

The chemical structure of the reaction product is not susceptible of easy definition. Its structure is clearly composed of a substantial polyethylene segment, $(-CH_2-CH_2-)_n$. However, dispersed at regular, but undefinable intervals within the polyethylene molecules are the new diene segments, $(-CH_2-CH=CH-CH_2-)_n$. It has not been possible through infrared analysis or otherwise to show the period of these segments or their location within the polymer chains with any degree of certainty. This problem is aggravated with higher-order dienes. For this reason, the active bonding sites may appear in side branches or in the backbone of the polyethylene molecules, or both, depending upon many factors including the size and carbon content of the diene monomer used. Therefore, until and unless future testing proves otherwise, the structures of these unsaturated ethylene polymers are best defined by the process for preparing the same, as described above and in the claims below.

Processes for Using Unsaturated Ethylene Polymers

In these preferred processes, intermediate uses are shown for the chemically-active compounds finally prepared by applicants' process described above.

Defined broadly, the first process of this aspect of applicants' invention provides for the controlled cross-linking of applicants' unsaturated polyethylenes in the melt phase with a commercially-available polyethylene which is present in an amount of between about 20 weight percent and about 40 weight percent of the melt composition. This controlled cross-linking proceeds under mild conditions and without the use of chemical or irradiant initiation, as required in all known cross-linking procedures.

In this context, reference to "a commercially-available polyethylene" is meant to include any ethylene polymer available now or in the future that has minimal or no branching and no chemically-active bonding sites. Preferred concentrations of this polyethylene are indicated as between about 20 weight percent and about 40 weight percent of the resultant mixture. This range is based upon experiments to date, and upon applicants' attempt to maximize the amount and effect of cross-linking accomplished by the process. Concentrations appreciably below about 20 weight percent tend to result in some cross-linking, but to such a small degree that little benefit in cryogenic or other properties is obtained. Concentrations appreciably above about 40 weight percent tend to result in a physical blending of the two polyethylenes, as the effect of cross-linking is overpowered by the bulk of the physical mixture. No absolute density restrictions are known at this time, although the optimum range has been found to be between about 0.900 and about 0.945, with greater densities (particularly in excess of 0.970) tending to prevent the cross-linking reaction from proceeding to completion.

As briefly discussed above, cross-linking is a common technique for tailoring physical properties of polymers once they are formed. For example, cross-linking is said to increase the glass-transition temperature of a polymer. G. R. Cotton and W. Sacks, *J. Polymer Sci.* [A]1, 1345 (1963); K. Schmieder and K. Wolf, *Colloid A.*, 134, 149 (1963). Cross-linking also increases moduli and yield stresses thereby decreasing the effects of strain and breakage on the polymer. A small amount of cross-linking may even increase the breaking stress of brittle polymers such as high-density polyethylene; but with a few percent more of cross-linking, it may reduce that same breaking stress to a much lower value. P. J. Flory, *J. Polymer Sci.*, 4, 435 (1969); E. E. Colichman and R. F. Fish, *Nucleonics*, 15, 134 (1957).

According to G. Gee, *J. Polymer Sci.*, 2, 451 (1957) and others, the degree of cross-linking is the most important single factor determining the tensile breaking stress and other properties of polyethylene. As the degree of cross-linking increases, the polymer molecules become more oriented against stretching and thus become harder. This also increases crystallinity. S. Bonotto, *J. Appl. Polymer Sci.*, 9, 3819 (1965), reported that at ambient temperatures, cross-linked polyethylene reinforces crystallinity, whereas above the crystal melting point it is more flexible similar to rubber. This Bonotto cross-linking must occur in the manufacturing process, and not in the modification process. He does not have the flexibility to modify his polymer once it is formed, and has no controlled or positioned cross-linking.

S. Turner, *Brit. Plastic*, 38, 44 (1965), coined the term "reinforcement factor" by adding vinyl chloride, as a filler agent, to increase the impact properties of polyethylene. Vinyl chloride and other adjuvants were acting as Turner's cross-linking agents giving a copolymer and not a pure polyethylene product. Other references use various functional groups (such as vinyl chloride) as agents to attempt controlled cross-linking reactions. Polyethylene cross-linking in catalytic processes has also been reported to be controlled to some degree, but with various catalysts, with high temperatures ranging from 500° F. to over 900° F., and with extreme pressures ranging from 100 to 2,000 atmospheres being required.

Part of the unobviousness of applicants' cross-linking process is its provision for controlled cross-linking to produce a cross-linked polyethylene or other structure without harsh conditions and without the requirement of chemical or irradiant initiation as taught in the prior art. Moreover, the physical properties of applicants' cross-linked product are controlled in large part by the amount of cross-linking achieved; and this degree of cross-linking is a function of the percentage composition of the two polyethylenes in the melt phase. Therefore, physical properties such as melting point ranges, specific gravities, dielectrics, stress and crack resistance, fatigue, flexibility, toughness, and crystallinity can be tailored to a specific application as, for example, by merely changing applicants' composition in the melt phase at atmospheric pressure. This is a major breakthrough in polymer chemistry, and a significant improvement over all known cross-linking procedures.

As indicated, the preferred conditions for applicants' cross-linking process exhibit significant variance from accepted cross-linking procedures. These conditions are as follows:

An amount of applicants' unsaturated polyethylene with chemically-active carbon-carbon double bonds was first placed in a reaction vessel in pulverized form. An amount of a pulverized commercially-available polyethylene was then placed in the vessel to come within the preferred composition range. As previously indicated, that preferred range is about 80–60 weight percent unsaturated polyethylene and about 20–40 weight percent commercially-available polyethylene in the melt phase. The two polyethylene resins were mixed thoroughly (for example, for about 15 minutes); and the vessel and its contents were heated to between about 250° F. and about 600° F. until the reaction mixture was melted. The melt was then maintained under heat for a period of at least 2 minutes or more to insure complete cookout, i.e., curing or cross-linking, of the resins. In this regard, the precise temperature and period for the reaction depend, of course, upon many factors including available facilities, reagent concentrations, desired reaction yields and the like. As previously stated, an important consideration is that the two polyethylenes reach the melt phase with sufficient energy to permit cross-linking to occur. For example, temperatures appreciably below about 250° F. could make it hard to obtain proper curing or cross-linking of the resins which typically melt at around 200° F. Reaction temperatures appreciably above about 600° F. could result in burning of the resins. Experiments to date have shown the preferred temperature is 375° F. and the preferred reaction time is 15 minutes to achieve complete cross-linking of the resins. One further condition, unique to applicants' cross-linking process, is that it proceeds at atmospheric pressure without the need for maintaining an inert (or other artificial) environment and without the use of chemical or irradiant initiation.

Once cooled, the resulting resin has a controlled cross-linked polyethylene structure exhibiting unique physical properties. To verify this fact, applicants conducted X-ray and infrared analysis, melting point tests, dielectric measurements, elongation, tensile strength and stress and strain measurements, melt density measurements, and dart impact studies for sample blends of the two preferred polyethylene resins. The procedures and results are summarized in Example 7 below. The cross-linked polyethylenes prepared by applicants' process have many present uses. They are also potentially valuable in many unexplored areas because of their unique physical properties (in the cryogenic and dielectric areas, in particular) and the ability to tailor those properties to meet situations encountered.

A second embodiment of this aspect of applicants' invention comprises a process for reacting applicants' unsaturated polyethylenes with any number of functional groups, polymeric and nonpolymeric alike, that can undergo free-radical addition to the chemically-active carbon-carbon double bonding sites on the polyethylene molecules. For example, simple polyethylene was shown above to react with applicants' active polyethylene resins to produce a pure polyethylene cross-linked structure exhibiting unique properties as detailed in the examples below.

Moreover, applicants' controlled cross-linking process has been shown to proceed with polymers other than polyethylene as well as with nonpolymeric adjuvants and with combinations thereof. These substances attach to the carbon-carbon double bonds in the unsaturated polyethylene molecules either as end reactions or as quasi cross-linking agents connecting the polyethylene molecules with other polymers in the characteristic cross-linked structures. For example, acrylic plastic was reacted in this way to produce a flexible transparent plastic approximately 0.250 inches thick. Styrene was also reacted with similar results. Bi-functional groups such as $Fe^{+2}$, $Zn^{+2}$, $Cu^{+2}$, and $SO_4^{-2}$ were also shown to add to the carbon-carbon double bonds in the polymer chains as end reactions. Epoxy, amines and amides were the only adjuvants which did not appear to react to form additions or cross-links in experiments performed to date.

Summarizing, these preferred processes for using applicants' unsaturated ethylene polymers in cross-linking reactions or in free-radical additions evidence only some uses for the invention described and claimed herein. Its future applications are as numerous as the imagination or need of researchers in the industry to tailor physical properties of ethylene and other polymers to specific applications encountered. The controlled nature of applicants' processes, operating under mild conditions and without the need for chemical or irradiant initiators or catalysts, adds substantially to the importance of applicants' discovery. While the procedures disclosed above illustrate the preferred processes for preparing, cross-linking, and free radically reacting these unsaturated ethylene polymers based on experimental and theoretical information learned to date, alternate procedures may in fact be performed outside applicants' preferred embodiments. The same are nonetheless believed within the scope and extent of applicants' invention as described and claimed herein.

EXAMPLE 1

99 pounds of pulverized GULF No. 5104 polyethylene were placed in a reaction vessel. This polyethylene was prepared by direct conversion of ethylene gas to polyethylene through a high-temperature and high-pressure process characteristic of known procedures. The polyethylene is saturated and linear with a density of approximately 0.923. 1 pound of liquid 1,3-butadiene at 0° C. was placed in the vessel, and the contents were mixed for 15 minutes during which time most of the 1,3-butadiene was absorbed into the pulverized polyethylene resin. The vessel and its contents were heated to 278° F. and maintained at that temperature for 12 minutes. The reacted polyethylene which now had active carbon-carbon double bonds was then allowed to cool, removed from the vessel, and pulverized to a commercially-acceptable form.

Infrared analysis of the new resin was conducted using standard equipment and procedures. The results of this analysis gave definite indication of the presence of carbon-carbon double bonds thus proving the polyethylene was not completely saturated. It was rather available for cross-linking or addition of other functional groups both polymeric and nonpolymeric alike, as described in examples to follow. The polyethylene was tested and found useful in blow and injection molding procedures and in other commercial applications in which standard polyethylenes are normally used.

EXAMPLE 2

89 pounds of pulverized GULF No. 5104 polyethylene were added to 3 pounds of liquid 1,3-pentadiene at 0° C. in a stainless steel reaction vessel. After mixing for 15 minutes to absorb the 1,3-pentadiene on the pulverized resin, the resultant mixture was heated to 285° F. and maintained at this temperature for 12 minutes until the polyethylene had completely melted. After allowing the reaction product to cool, it was pulverized and subjected to infrared analysis which indicated the presence of carbon-carbon double bonds in the polymer molecules. The now unsaturated polyethylene was found to perform satisfactorily in commercially practiced molding procedures.

EXAMPLE 3

79 pounds of pulverized GULF No. 5104 polyethylene were added to 1 pound of liquid 1,3-pentadiene at 20° C. in a stainless steel reaction vessel. After mixing for 15 minutes to absorb the 1,3-pentadiene on the pulverized resin, the resultant mixture was heated to 315° F. and maintained at this temperature for 15 minutes until the polyethylene had completely melted. After allowing the reaction product to cool, it was pulverized and subjected to infrared analysis which indicated the presence of carbon-carbon double bonds in the polymer molecules. The now unsaturated polyethylene was found to perform satisfactorily in commercially practiced molding procedures.

EXAMPLE 4

67 pounds of pulverized GULF No. 5104 polyethylene were added to 1 pound of liquid 1,3-hexadiene at 20° C. in a stainless steel reaction vessel. After mixing for 15 minutes to absorb the 1,3-hexadiene on the pulverized resin, the resultant mixture was heated to 315° F. and maintained at this temperature for 12 minutes until the polyethylene had completely melted. After allowing the reaction product to cool, it was pulverized and subjected to infrared analysis which indicated the presence of carbon-carbon double bonds in the polymer molecules. The now unsaturated polyethylene was found to perform satisfactorily in commercially practiced molding procedures.

EXAMPLE 5

49 pounds of pulverized GULF No. 5104 polyethylene were added to 1 pound of liquid 1,3-decadiene at 20° C. in a stainless steel reaction vessel. After mixing for 15 minutes to absorb the 1,3-decadiene on the pulverized resin, the resultant mixture was heated to 350° F. and maintained at this temperature for 12 minutes until the polyethylene had completely melted. After allowing the reaction product to cool, it was pulverized and subjected to infrared analysis which indicated the presence of carbon-carbon double bonds in the polymer molecules. The now unsaturated polyethylene was found to perform satisfactorily in commercially practiced molding procedures.

EXAMPLE 6

75 pounds of the unsaturated polyethylene produced in Example 1 were placed in a reaction vessel with 25 pounds of GULF No. 5104 polyethylene. The two polyethylenes were mixed for 15 minutes and then heated to 375° F. The resulting melt was maintained at this temperature for 5 minutes to insure complete cookout, i.e., curing or cross-linking of the resins. After cooling, the resulting polyethylene resin was pulverized to a commercially-acceptable form and found useful in injection blow molding, vacuum-forming and rotational molding.

Infrared analysis showed the absence of carbon-carbon double bonds, the product resembling a saturated hydrocarbon similar to that of polyethylene with some additional bands further indicating a chemical rearrangement had occurred. Standard X-ray analysis using copper, k-alpha radiation indicated a shift in the lattice constant (from D/N=4.28 to D/N=4.04) for the basic matrix between the layers of polyethylene. This change in lattice constant indicated a change in the distance between the linear layers of polyethylne which is a direct function of cross-linking. No apparent change was indicated in the distance between repeating segments, with the basic structure apparently remaining repeating segments of ethylene monomers. Therefore, it was clear that a chemical reaction had occurred between the layers of the two polyethylenes.

EXAMPLE 7

To further verify that chemical cross-linking had occurred between the two polyethylenes in Example 6, various physical properties were tested using standard techniques and equipment for the starting resins and for various melt blends of the GULF No. 5104 polyethylene and the unsaturated polyethylene of Example 1. Melting point measurements were taken at atmospheric pressure in an inert freon atmosphere at the thermal equilibrium condition using standard ASTM procedures. Dielectric measurements of resistance in centimeters were taken at atmospheric pressure in an inert freon atmosphere at 350° C. using a Dynascan digital multimeter. Measurements of tensile strength, elongation as a coefficient of expansion, and percent stress and strain at 0° C. as deviation before breaking were all taken using standard laboratory procedures (including a tensileometer). Melt density and bulk density measurements were taken using standard laboratory procedures. Dart impact tests were conducted on the polyethylene blends according to standard procedures ASTM D 256-56 and ASMT D 1709-62T. Impact is, of course, the ability of a material such as polyethylene to absorb the energy of a high-speed blow without breaking. As energy is involved, impact becomes necessarily a function of temperature. Impact studies were thus conducted from −454° F. to +122° F. with the lower temperature gradients being liquid helium at −454° F., liquid nitrogen at −328° F., and dry ice and ether at −148° F. Impact was measured in foot-pounds per square inch (ft-lb/in$^2$) with 0.5 ft-lb/in$^2$ selected as the brittle point for the samples as a function of both a temperature and aging. In this regard, aging affects impact measurements upon the basis of increases in crystallinity of the polyethylenes usually caused by ultraviolet degradation. Samples were therefore exposed to high-intensity ultraviolet radiation for a few hours to simulate the degradation occurring from sunlight over many years. Based upon previous ultraviolet exposure and X-ray determination for crystallinity, impact tests were correlated as a function of aged polyethylene with a predictable laboratory accuracy in excess of 95%. Generally speaking, the greater the density of a given polyethylene, the greater the impact resistance at ambient temperatures while the inverse is true under cryogenic conditions.

The results of these tests indicated marked variations in the specified concentration range from the expected linear relationship that would exist if merely a physical blending had occurred. These deviations (or abnormalties) indicated a definite change in chemical structure in the formation of a new product having valuable properties, particularly in the dielectric and cryogenic areas. For example, within the specified composition range the cross-linked resin exhibited greater impact resistance at ambient temperatures, greater resistance to ultraviolet degradation and aging, and tremendous impact strength at cryogenic temperatures in the −328° F. range which is to applicants' knowledge some −200° F. below any other polymer commercially known and used at this time. The new product also exhibited a significantly improved dielectric constant within the specified composition range, increased by a factor of 104 over that of the virgin resins.

EXAMPLE 8

The procedure in Example 6 was followed using 80 pounds of unsaturated polyethylene produced in Example 3, 20 pounds of EXXON LD 102 polyethylene (another commercially-available polyethylene similar to GULF No. 5104), and a melt temperature of 420° F. and curing time of 15 minutes. The reaction product was tested as in Examples 6 and 7 and was shown to be a pure polyethylene cross-linked structure having similarly improved physical properties and end uses.

EXAMPLE 9

The procedure in Example 6 was followed using 60 pounds of unsaturated polyethylene produced in Example 5, 40 pounds of EXXON LD 102 polyethylene (another commercially-available polyethylene similar to GULF No. 5104), and a melt temperature of 450° F. and curing time of 20 minutes. The reaction product was tested as in Examples 6 and 7 and was shown to be a pure polyethylene cross-linked structure having similar end uses and improved physical properties, but not to the same degree as the cross-linked polyethylenes in Examples 6 and 8, possibly due to greater separation of the cross-linked molecular attributes to the use of a larger diene monomer.

EXAMPLE 10

75 pounds of the unsaturated polyethylene produced in Example 1 were placed in a stainless steel reaction vessel with 25 pounds of acrylic polymer which had also been pulverized. The two polymers were mixed for 15 minutes and then heated to 400° F. The resulting melt was maintained at this temperature for five minutes to insure complete cookout, i.e., curing or cross-linking of the resin. After cooling, the resulting product was tested as in Examples 6 and 7 and was shown to be a polyethylene-acrylic cross-linked structure. It was pulverized to a commercially-acceptable form and found useful in injection molding, blow molding, rotational molding and vacuum-forming. This cross-linked structure displayed abnormal properties in impact resistance, dielectric strength and cryogenic resistance to impact stress and strain.

EXAMPLE 11

The procedure in Example 10 was followed using 75 pounds of the unsaturated polyethylene produced in Example 2, 25 pounds of acrilonitrile polymer, and a melt temperature of 400° F. and curing time of 15 minutes. Comparable results were obtained, including similar end uses and improved physical properties for the cross-linked product.

EXAMPLE 12

75 pounds of the unsaturated polyethylene produced in Example 4 were placed in a stainless steel reaction vessel with 25 pounds of polystyrene which had also been pulverized. The two polymers were mixed for 15 minutes and heated to 425° F. The resulting melt was maintained at the temperature for 5 minutes to insure complete cookout, i.e., curing or cross-linking of the resin. After cooling, the resulting product was shown to be a cross-linked polyethylene-styrene structure. It was pulverized to a commercially-acceptable form and found useful in injection molding, blow molding, rotational molding and vacuum-forming. This cross-linked product did not show the same degree of unique properties as the polyethylene-acrylic and polyethylene-acrilonitrile polymers in Examples 10 and 11. This was possibly due to a steric hindrance factor attributable to the bulky phenoxy group in the styrene molecules.

EXAMPLE 13

98 pounds of the unsaturated polyethylene produced in Example 1 were placed in a stainless steel reaction vessel with 2 pounds of ferrous ammonium sulfate which had been pulverized. The two components were mixed for 15 minutes and heated to 400° F. The resulting melt was maintained at this temperature for 5 minutes to insure completion of the reaction, i.e., addition of the functional groups iron ($Fe^{+2}$) and sulfate ($SO_4^{-2}$) to the available carbon-carbon double bonding sites on the polyethylene molecules. Subsequent testing revealed the double bonds had in fact vanished and new physical properties appeared thereby confirming that a selective addition reaction had occurred.

EXAMPLE 14

The procedure of Example 13 was followed using comparable amounts of unsaturated polyethylenes produced in Examples 3 and 5 with copper sulfate and with zinc sulfate as functional adjuvants. Melt temperatures between 380° F. and 420° F. and reaction periods between 5 minutes and 7 minutes were observed. In each case, subsequent testing revealed that addition reactions had occurred with the copper ($CU^{+2}$) and zinc ($Zn^{+2}$) functional groups chemically attaching to the polyethylene molecules. These results confirmed that selective addition and distribution of such functional groups along applicants' unsaturated polyethylene molecules can be simply and readily achieved.

EXAMPLE 15

The procedure and compounds of Examples 13 and 14 were used, except that amounts of the functional adjuvants were decreased by one-half and corresponding amounts of GULF No. 5104 polyethylene were added. Testing of the reaction products, as in Examples 6 and 7, revealed that cross-linking of the polyethylene molecules had occurred. The functional groups, apparently acting as quasi cross-linking agents, were trapped in the cross-linked structure linking the two polyethylenes. These results confirmed even more the selectivity and versatility of applicants' processes and products in tailoring physical properties of ethylene and other polymers to meet specific needs.

We claim:

1. A process for preparing an unsaturated ethylene polymer, comprising the steps of:
   (a) mixing pulverized low or medium density saturated, linear polyethylene with liquid conjugated diene monomer having from 4 to about 10 carbon atoms and being present in an amount up to about 5 weight percent of the mixture;
   (b) bringing said mixture to a temperature that melts the polyethylene; and
   (c) maintaining said melt temperature until the polyethylene melts, said mixing, bringing and maintaining being without chemical or irradiant initiation.

2. The process in claim 1 wherein said bringing and maintaining are at atmospheric pressure and a temperature of between about 250° F. and about 400° F.

3. The process in claim 2 wherein said bringing and maintaining are for a period of between about 2 minutes and about 15 minutes.

4. The process in claim 1 wherein the diene momoner is liquid 1,3-butadiene at a temperature less than about 4° C. prior to said mixing.

5. The process in claim 1 or 3 wherein the density of the polyethylene is between about 0.900 and about 0.945.

6. The process in claim 1 or 3 wherein the diene monomer is liquid, said mixing comprising absorbing the diene monomer into the polyethylene resin.

7. The process in claim 6 wherein said bringing and maintaining are at a temperature of about 278° F. for a period of about 15 minutes.

8. The process in claim 7 wherein the diene monomer is 1,3-butadiene at a temperature less than about 4° C. during said absorbing and prior to said mixing.

9. The process in claim 8 wherein the 1,3-butadiene is present as about 5 weight percent of the reaction mixture.

10. The process in claim 7 wherein the diene monomer is 1,3-pentadiene, said bringing and maintaining being at a temperature of about 285° F. and for a period of about 15 minutes.

11. The process in claim 1 which additionally includes the step of recovering the unsaturated ethylene polymer made during said bringing and maintaining.

12. A process for preparing an unsaturated ethylene polymer, comprising the steps of:
   (a) placing an amount of low or medium density saturated, linear polyethylene in a reaction vessel;
   (b) placing an amount of liquid conjugated diene monomer in the reaction vessel, the diene monomer having from 4 to about 10 carbon atoms and being present in an amount up to about 5 weight percent of the reaction mixture; and
   (c) bringing the contents of the reaction vessel to a temperature sufficient to melt the polyethylene without chemical or irradiant initiation.

13. The process in claim 12 which additionally includes the step of:
   (d) mixing the polyethylene and the diene monomer.

14. The process in claim 12 which additionally includes the step of:
   (d) after said placing and before said bringing, mixing the contents placed in the reaction vessel in steps (a) and (b).

15. The process in claim 14 wherein the diene monomer is liquid, said mixing including absorbing the diene monomer into the polyethylene resin.

16. The process in claim 15 wherein said bringing is to a temperature of between about 250° F. and about 400° F.

17. The process in claim 16 which additionally includes the step of:
  (e) after said bringing, maintaining the contents of the reaction vessel at the elevated temperature for a period of between about 2 minutes and about 15 minutes.

18. The process in claim 17 wherein the diene monomer is 1,3-butadiene, said bringing being to a temperature of about 278° F. and said maintaining being for a period of about 15 minutes.

19. The process in claim 17 wherein the diene monomer is 1,3-pentadiene, said bringing being to a temperature of about 285° F. and said maintaining being for a period of about 15 minutes.

20. The process in claim 17 which additionally includes the step of:
  (f) after said bringing and said maintaining, recovering the unsaturated polyethylene reaction product.

21. An unsaturated ethylene polymer characterized by the process, comprising the steps of:
  (a) mixing pulverized low or medium density saturated, linear polyethylene with liquid conjugated diene monomer having from 4 to about 10 carbon atoms and being present in an amount up to about 5 weight percent of the mixture;
  (b) bringing said mixture to a temperature that melts the polyethylene; and
  (c) maintaining said melt temperature until the polyethylene melts, said mixing, bringing and maintaining being without chemical or irradiant initiation.

22. The polymer in claim 21 further characterized in that the bringing and maintaining are at atmospheric pressure and a temperature of between about 250° F. and about 400° F.

* * * * *